(12) United States Patent
Chang

(10) Patent No.: US 8,528,849 B2
(45) Date of Patent: Sep. 10, 2013

(54) RATCHET BUCKLE

(75) Inventor: Wen Cheng Chang, Changhua (TW)

(73) Assignee: Win Chance Metal Co., Ltd., Changhua (TW)

( * ) Notice: Subject to any disclaimer, the term of this patent is extended or adjusted under 35 U.S.C. 154(b) by 346 days.

(21) Appl. No.: 12/890,771

(22) Filed: Sep. 27, 2010

(65) Prior Publication Data

US 2012/0073097 A1 Mar. 29, 2012

(51) Int. Cl.
*B65H 75/38* (2006.01)

(52) U.S. Cl.
USPC ......... 242/388.4; 254/217; 24/68 CD; 24/909

(58) Field of Classification Search
USPC ............. 242/388, 388.1, 388.2, 388.3, 388.4; 24/68 CD, 909, 68 R, 68 B, 68 E; 254/217, 254/218, 237, 238, 213, 223
See application file for complete search history.

(56) References Cited

U.S. PATENT DOCUMENTS

| 3,749,366 | A | * | 7/1973 | Brucker | 24/68 CD |
| 4,185,360 | A | * | 1/1980 | Prete et al. | 24/68 CD |
| 5,271,606 | A | * | 12/1993 | Kamper | 254/217 |
| 5,426,826 | A | * | 6/1995 | Takimoto | 24/68 CD |
| 5,560,086 | A | * | 10/1996 | Huang | 24/68 CD |
| 5,943,742 | A | * | 8/1999 | Huang | 24/68 CD |
| 6,547,218 | B2 | * | 4/2003 | Landy | 254/217 |
| 6,808,164 | B2 | * | 10/2004 | Chang | 254/217 |
| 7,752,717 | B2 | * | 7/2010 | Hanson | 24/68 CD |
| 8,157,245 | B2 | * | 4/2012 | Huang | 254/218 |

* cited by examiner

*Primary Examiner* — William A Rivera
(74) *Attorney, Agent, or Firm* — Alan Kamrath; Kamrath IP Lawfirm, P.A.

(57) ABSTRACT

A ratchet buckle has a body and a trigger. One end of the body has two opposite pivotal holes, two opposite positioning notches, and a pivotal shaft penetrating the pivotal holes. Two ends of the pivotal shaft each have a ratchet wheel synchronously rotating with the pivotal shaft. One end of the trigger has two opposite shaft holes engaged to the pivotal shaft of the body and has a positioning rod transversally mounted on the trigger to engage the two positioning notches of the body. By operating the trigger to set the pivotal shaft free, the pivotal shaft is easily rotated to reel a strap.

5 Claims, 10 Drawing Sheets

RATCHET BUCKLE

BACKGROUND OF THE INVENTION

1. Field of the Invention

The present invention relates to a ratchet buckle and, more particularly, to a ratchet buckle that easily reels a strap without resistance.

2. Description of Related Art

In the transportation operation of general goods, racks will be located on vehicles to limit movement of the goods, and straps will tie up the racks to ensure the stability of the goods. The tightening of the straps is made by hooks at ends of the straps hooking at two sides of a track frame and fastened by ratchet buckles.

As shown in FIGS. 8 and 9, a conventional ratchet buckle comprises a body 6 and a trigger 7. The body 6 has a first end and a second end. The first end of the body 6 has two pivotal holes 61 formed oppositely to pivotally engage a pivotal shaft 62, which is mounted with a reel of strap. Two ratchet wheels 63 sleeve on the pivotal shaft 62 on inner sides of the two pivotal holes 61 respectively. The second end has a fixing rod 64 transversally formed and mounted with another strap. An interior of the body 6 has a resiliently slidable locking board 65 operationally extending to one dent of the ratchet wheels 63 to lock. The trigger 7 has a first end and a second end. The first end of the trigger 7 has two shaft holes 71 oppositely formed to sleeve on the pivotal shaft 62. The second end of the trigger 7 has a grip 72 for holding by users. Additionally, the trigger 7 has a resilient slidable pushing board 73 extended to engage one dent of the ratchet wheel 63 for locking and driving the ratchet wheel 63 and the pivotal shaft 62 to rotate. By operating the trigger 7 to pivotally swing relative to the body 6, the strap is reeled on the pivotal shaft 62. By locking the ratchet wheels 63 timely, the straps are ensured not to loosen.

Additionally, when the strap is withdrawn, the trigger 7 is pulled away from the body 6 to spread to make the ratchet wheels 63 secured on the two ends of the pivotal shaft 62 unlocked by the locking board 65 and the pushing board 73. Thereby, the pivotal shaft 62 is released to make the user rapidly withdraw and collect the strap.

However, in actual operation, when the trigger 7 is pulled away from the body 6 as shown in FIG. 10, the locking board 65 of the body 6 provides a pushing force to the trigger 7 to make the inner edge of the two shaft holes 71 of the trigger 7 abut one side edge of the pivotal shaft 62. Meanwhile, the pushing board 73 of the trigger 7 provides a pushing force to the body 6 to make the two pivotal holes 61 of the body 6 tightly abut a corresponding side edge of the pivotal shaft 62, i.e. the two pivotal holes 61 of the body 6 and the two shaft holes 71 of the trigger 7 are misaligned, and, thus, a shearing force is caused and interferes with the pivotal shaft 62, which leads to retard rotation. Therefore, the straps cannot be rapidly withdrawn or collected.

SUMMARY OF THE INVENTION

A main objective of the present invention is to provide a ratchet buckle that has no shearing force and easily reels straps.

To achieve the main objective, the ratchet buckle in the present invention comprises:

a body having a first end and a second end, wherein the first end of the body has:

two pivotal holes formed oppositely to engage with a pivotal shaft adapted to reel a strap;

two positioning notches formed oppositely; and two ratchet wheels attached on inner sides of the two pivotal holes respectively; and a trigger having a first end and a second end, wherein the first end of the trigger has:

two shaft holes formed oppositely and sleeving the pivotal shaft of the body; and a positioning rod transversally attached to the first end of the trigger and engaged to the two positioning notches of the body to locate the relative position of the body and the trigger to keep the two pivotal holes of the body and the two shaft holes of the trigger concentric and thus to keep the pivotal shaft of the body from being pressed by shearing force to rotate easily;

wherein a distance between the centers of the positioning notches and the pivotal holes of the body is equal to a distance between centers of the positioning rod and the shaft holes of the trigger.

Further benefits and advantages of the present invention will become apparent after a careful reading of the detailed description with appropriate reference to the accompanying drawings.

DETAILED DESCRIPTION OF THE PREFERRED EMBODIMENT

Figure 1:
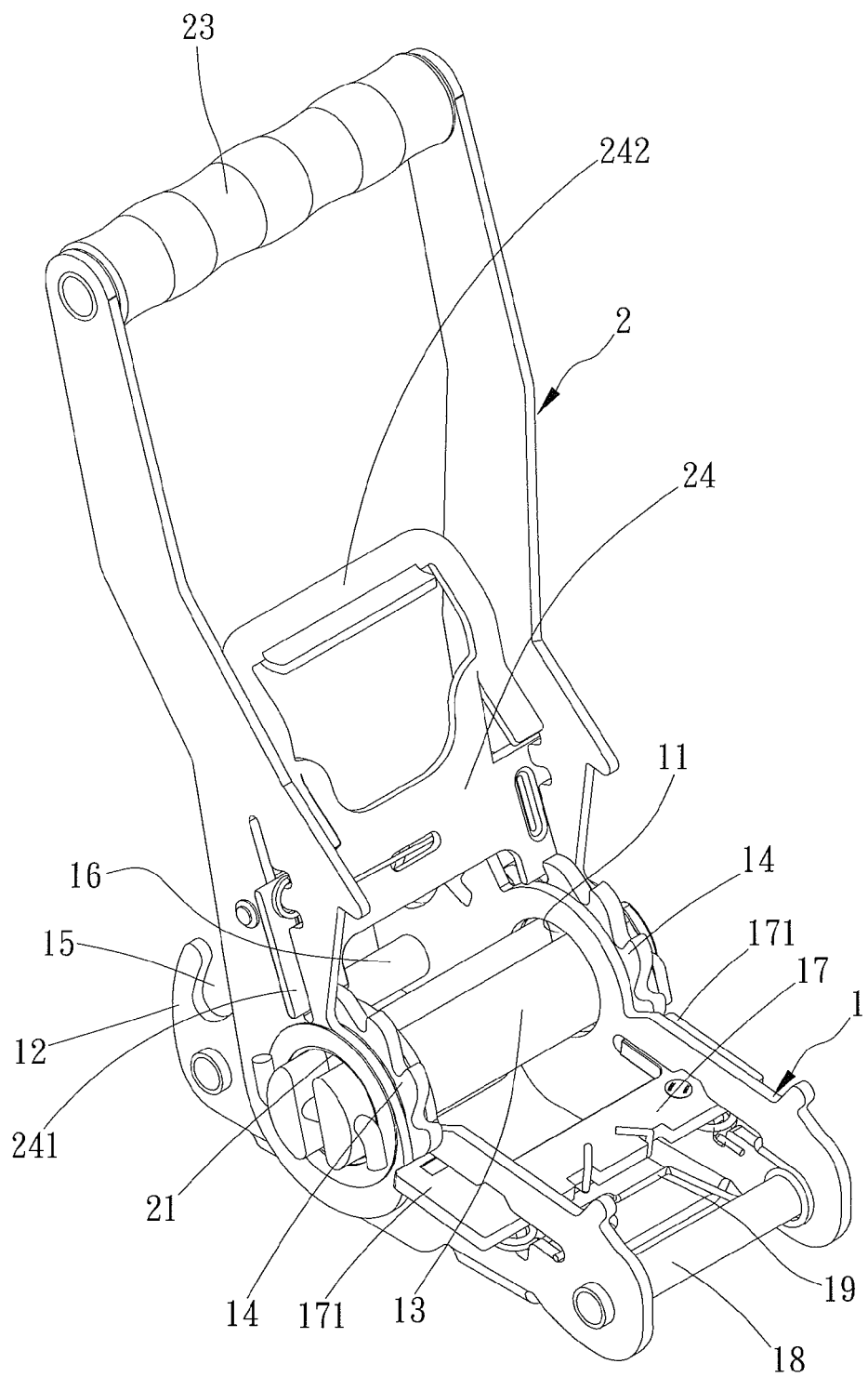
FIG. 1 is a perspective view of a ratchet buckle in accordance with the present invention.
Figure 2:
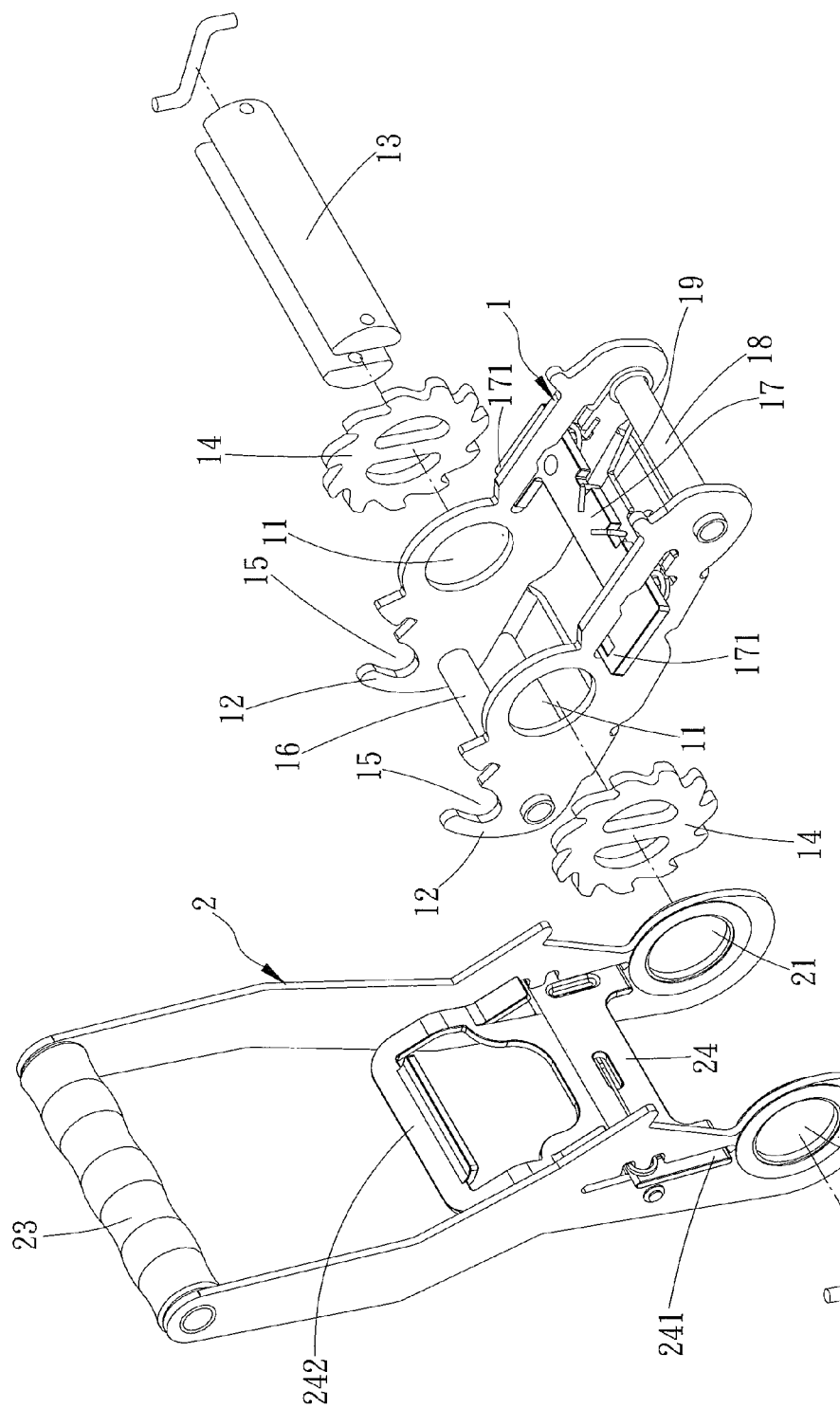
FIG. 2 is one exploded perspective view of the ratchet buckle in FIG. 1.
Figure 3:
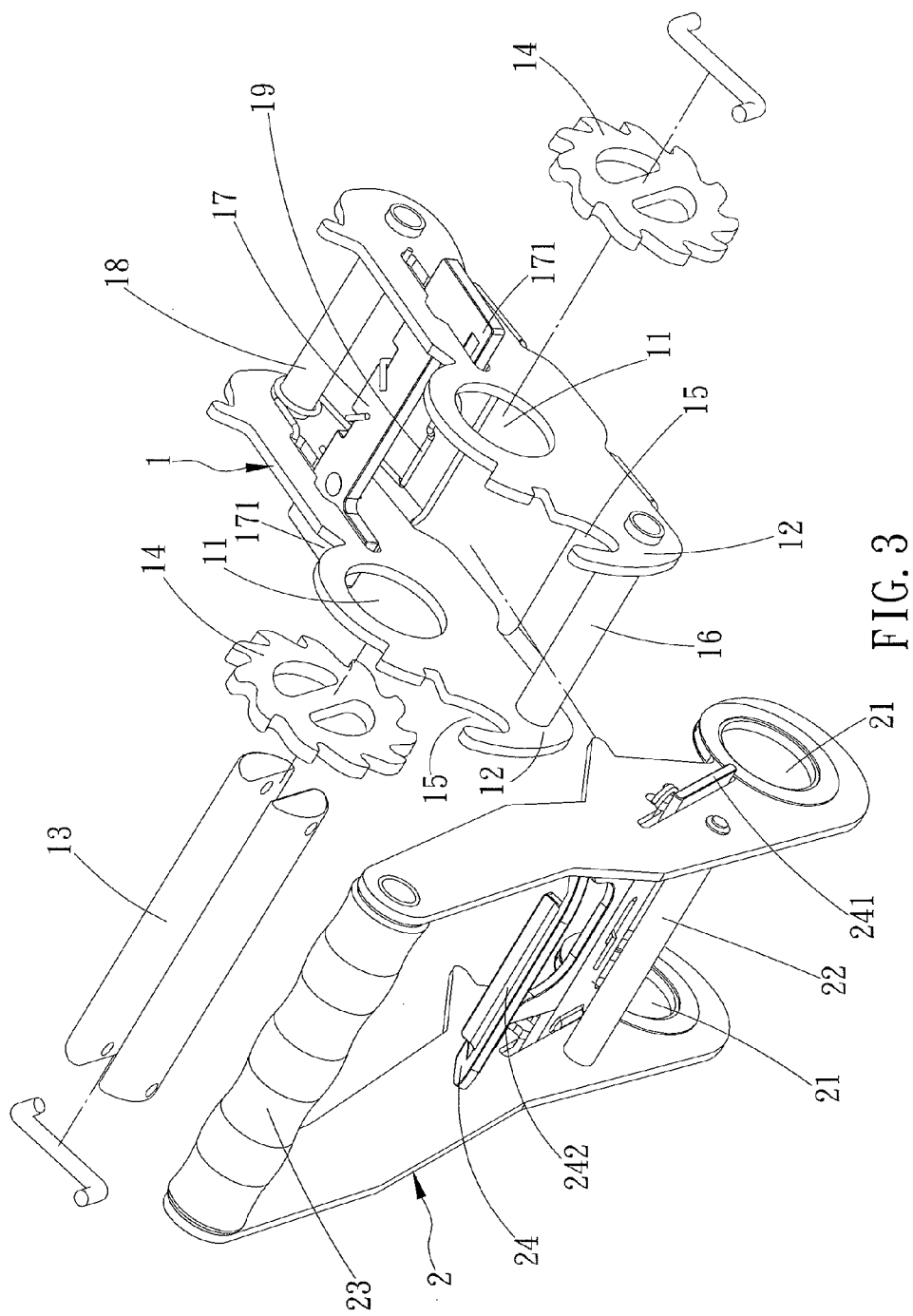
FIG. 3 is another exploded perspective view of the ratchet buckle.
Figure 4:
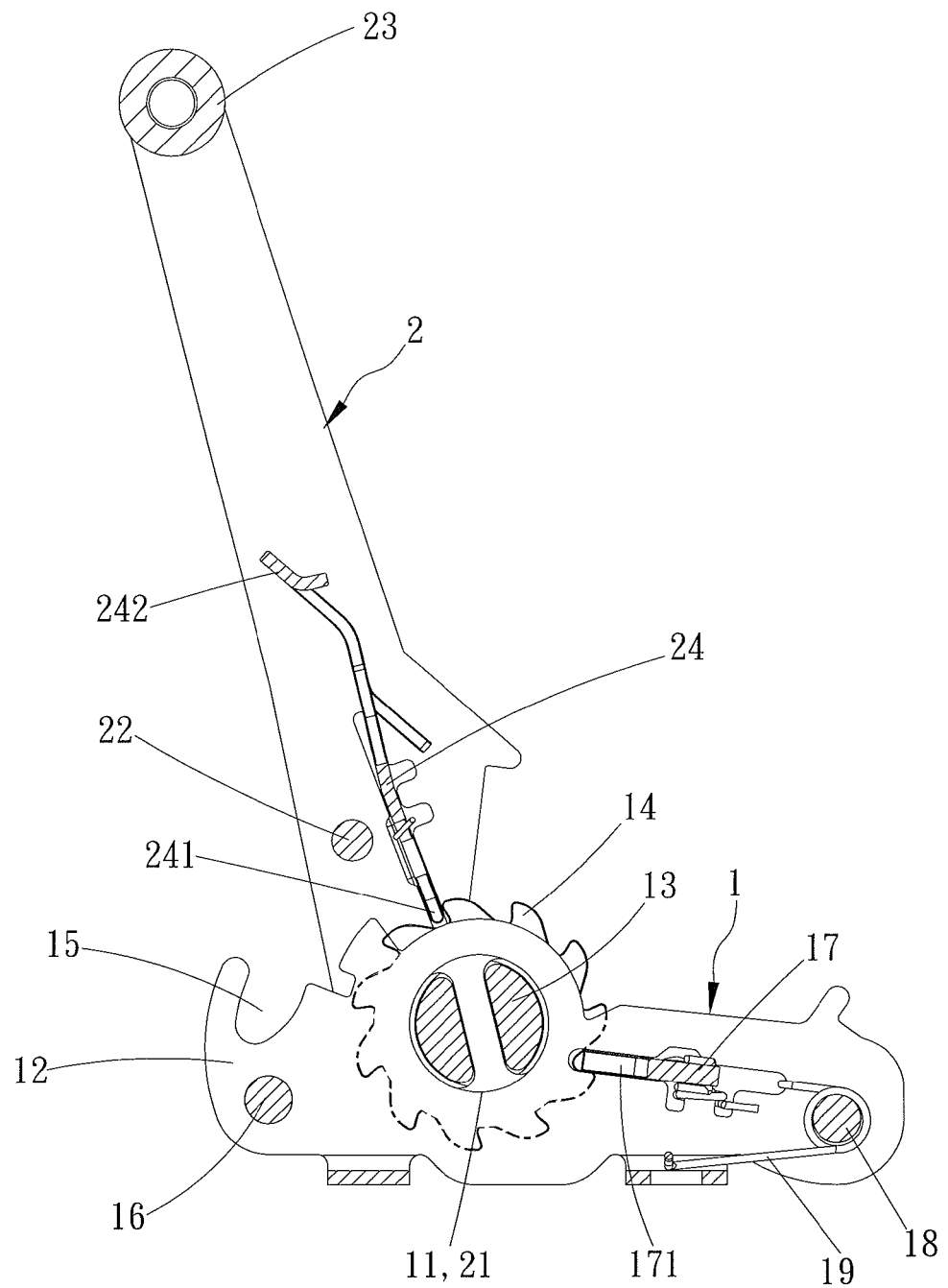
FIG. 4 is a partially cross-sectional side view of the ratchet buckle in FIG. 1.

A ratchet buckle in accordance with the present invention comprises a body and a trigger. One end of the body has two opposite pivotal holes, two opposite positioning notches, and a pivotal shaft penetrating the pivotal holes. Two ends of the pivotal shaft each have a ratchet wheel synchronously rotating with the pivotal shaft. One end of the trigger has two opposite shaft holes engaged to the pivotal shaft of the body and has a positioning rod transversally mounted on the trigger to engage the two positioning notches of the body. By operating the trigger to set the pivotal shaft free, the pivotal shaft is easily rotated to reel a strap.

As shown in FIGS. 1 to 4, a preferred embodiment of a ratchet buckle in accordance with the present invention comprises a body 1 and a trigger 2. The body 1 has a first end and a second end. The first end of the body 1 has two opposite pivotal holes 11 and two opposite extension portions 12. The two pivotal holes 11 are penetrated by a pivotal shaft 13, which is adapted to reel straps. Two ratchet wheels 14 are mounted to inner sides of the pivotal holes 11 respectively. The two extension portions 12 each have a concave positioning notch 15. A supporting rod 16 is mounted between the two extension portions 12 for enhancement to prevent the two extension portions 12 from deforming easily. The body 1 has a resilient slidable locking board 17 mounted inside its interior. Two ends of the locking board 17 each have a tongue 171 extending out of the body 1 and engaging a corresponding dent of the ratchet wheels 14.

The trigger 2 has a first end and a second end. The first end of the trigger 2 has two opposite shaft holes 21 sleeving the pivotal shaft 13 of the body 1 and has a positioning rod 22 transversally mounted on the positioning notches 15 of the body 1 at its middle section correspondingly. Therefore, the trigger 2 is pivotally combined to the body 1 and pivotally swings to the body 1 relatively. The positioning rod 22 has a round cross-section. The second end of the trigger 2 has a grip 23 for holding by a user and a resilient slidable pushing board 24 inside its interior. The pushing board 24 has two sides each with a pushing portion 241 extending out of the trigger 2 to engage a corresponding dent of the ratchet wheel 14 for locking and to drive the ratchet wheel 14 and the pivotal shaft 13 to rotate. The pushing board 24 has a pulling bar 242 formed opposite to the two pushing portions 241 to be pulled by users.

A distance between centers of the positioning notch 15 and the pivotal hole 11 of the body 1 is equal to a distance between centers of the positioning rod 22 and the shaft hole 21 of the trigger 2.

The second end of the body 1 further has a fixing rod 18.

Figure 5:
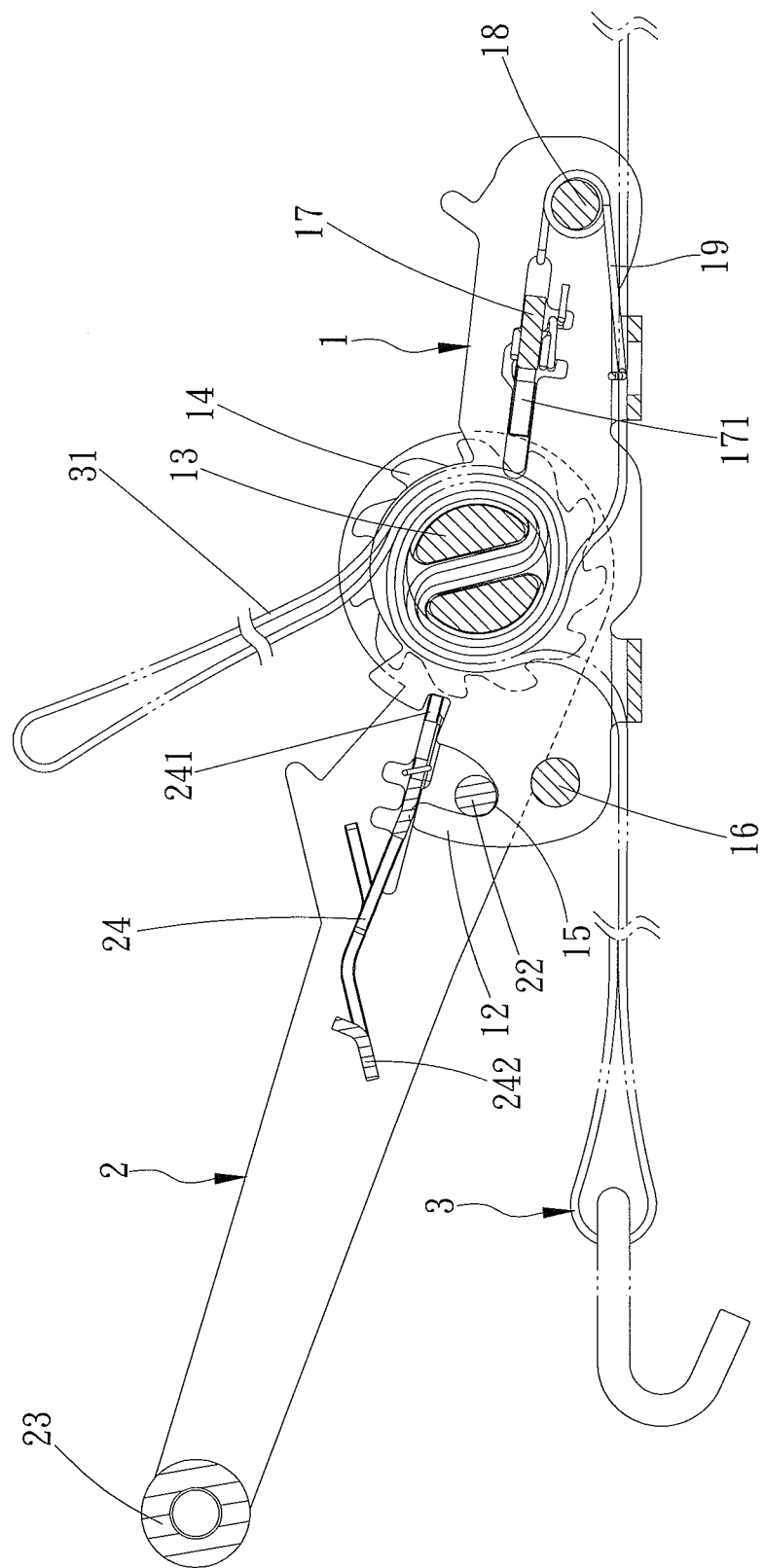
FIG. 5 is one cross-sectional side view of the ratchet buckle, which is expanded and combined with a strap.
Figure 6:
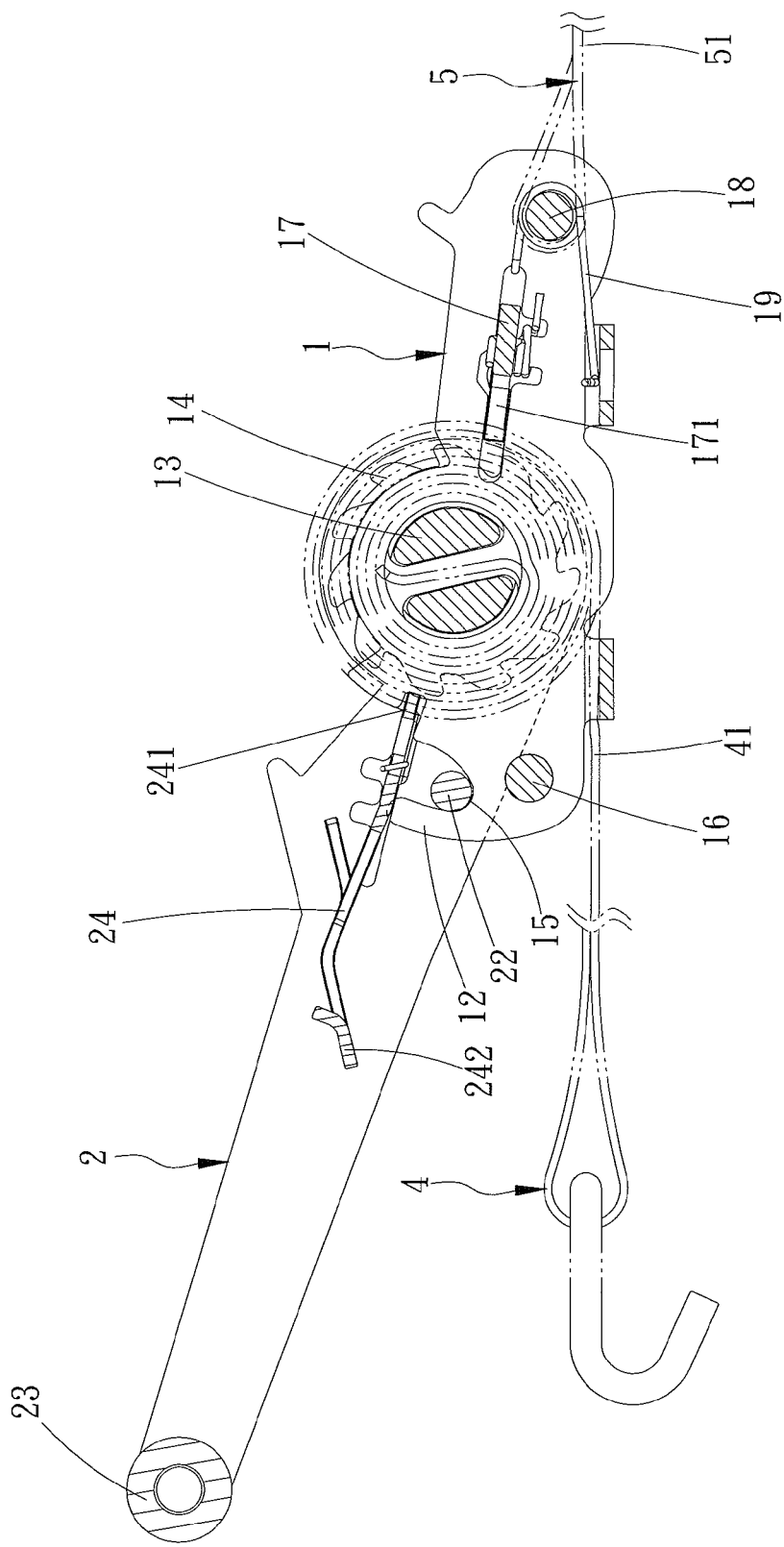
FIG. 6 is another cross-sectional side view of the ratchet buckle, which is expanded and combined with the strap.

When the ratchet buckle operates, as shown in FIG. 5, a strap 31 of a fastening tool 3 has a middle section winding and attached to the pivotal shaft 13 of the body 1. Otherwise, as shown in FIG. 6, one strap 41 of a fastening tool 4 has a distal end winding and attached to the pivotal shaft 13 of the body 1, and another strap 51 of a fastening tool 5 has a distal end circling the fixing rod 18 on the second end of the body 1. When the straps 31, 41 are rapidly drawn out or collected, the trigger 2 is pulled away from the body 1 to expand so that the ratchet wheels 14 on two ends of the pivotal shaft 13 are not locked by the locking board 17 and the pushing board 24 to allow the pivotal shaft 13 free to rotate.

Figure 7:
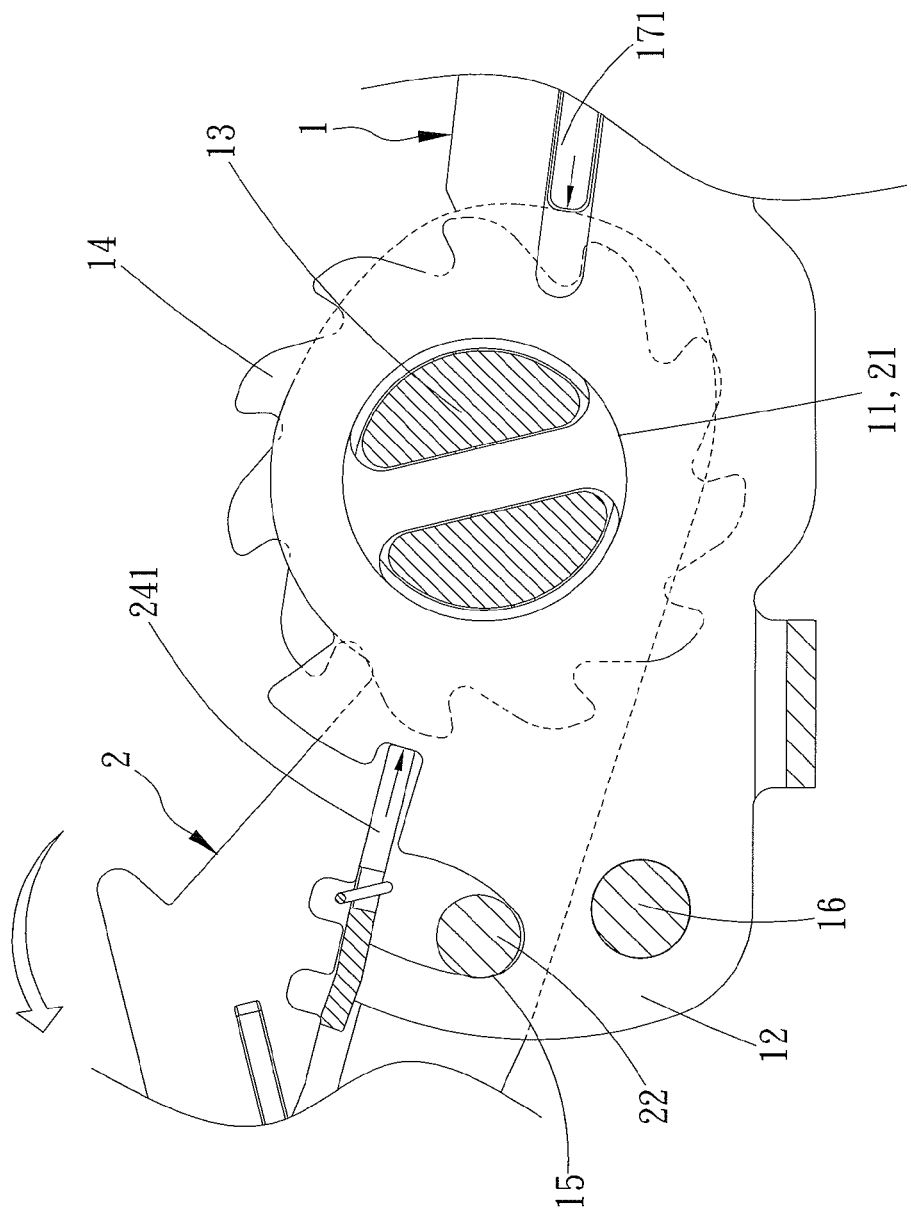
FIG. 7 is a partially enlarged cross-sectional side view of a pivotal shaft of the ratchet buckle.
Figure 8:
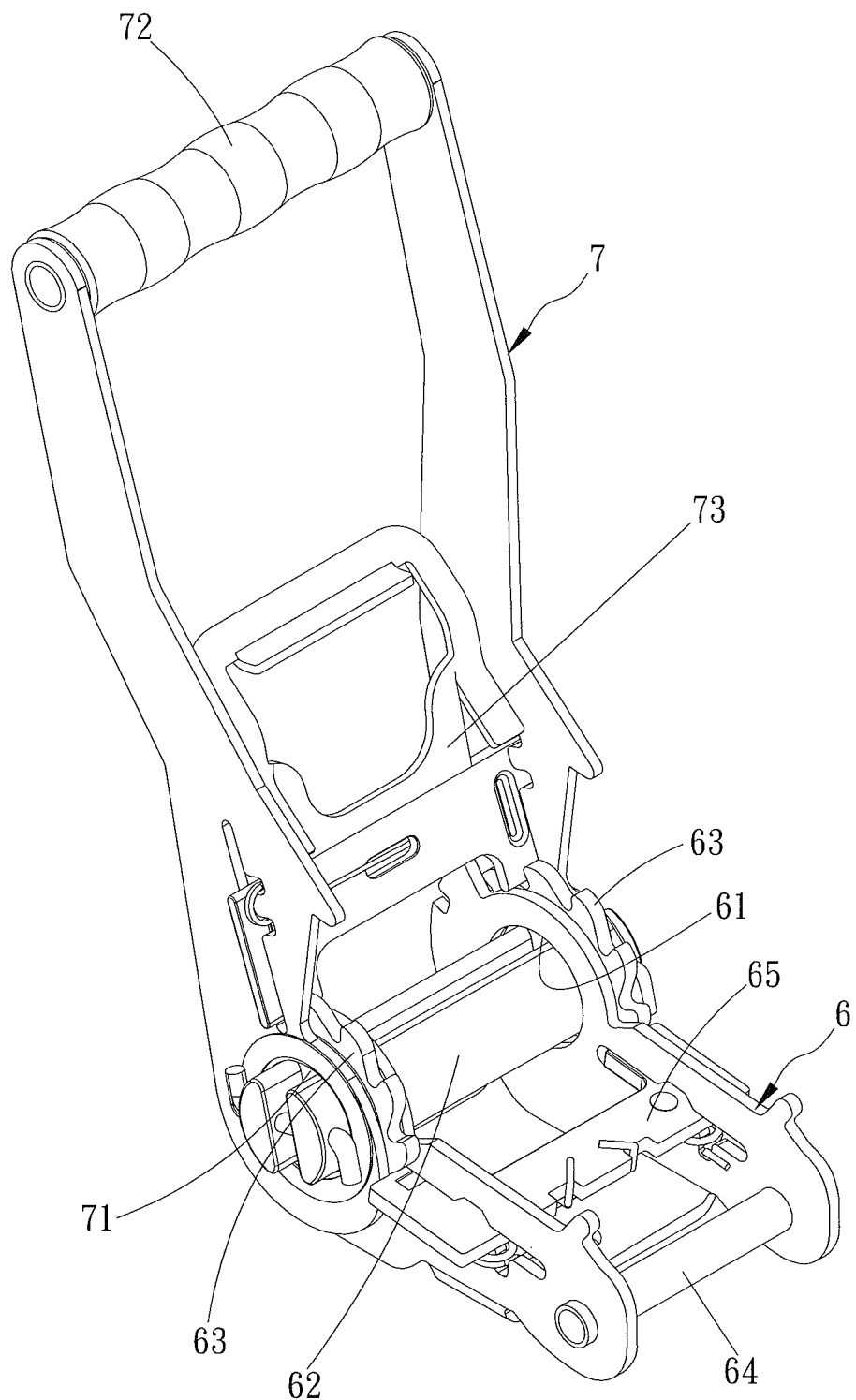
FIG. 8 is a perspective view of a ratchet buckle in accordance with the prior art.
Figure 9:
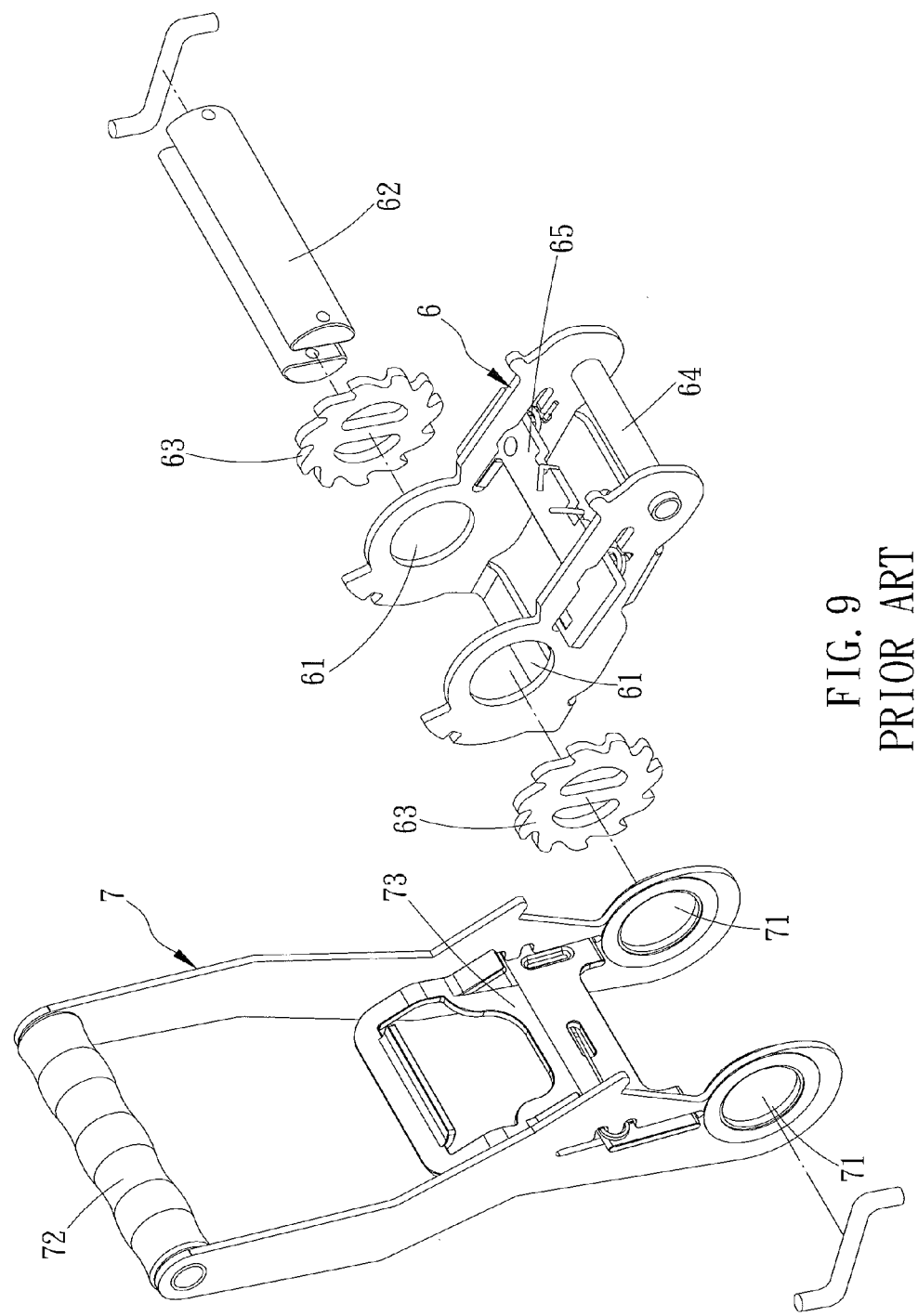
FIG. 9 is an exploded perspective view of the ratchet buckle in accordance with the prior art.
Figure 10:
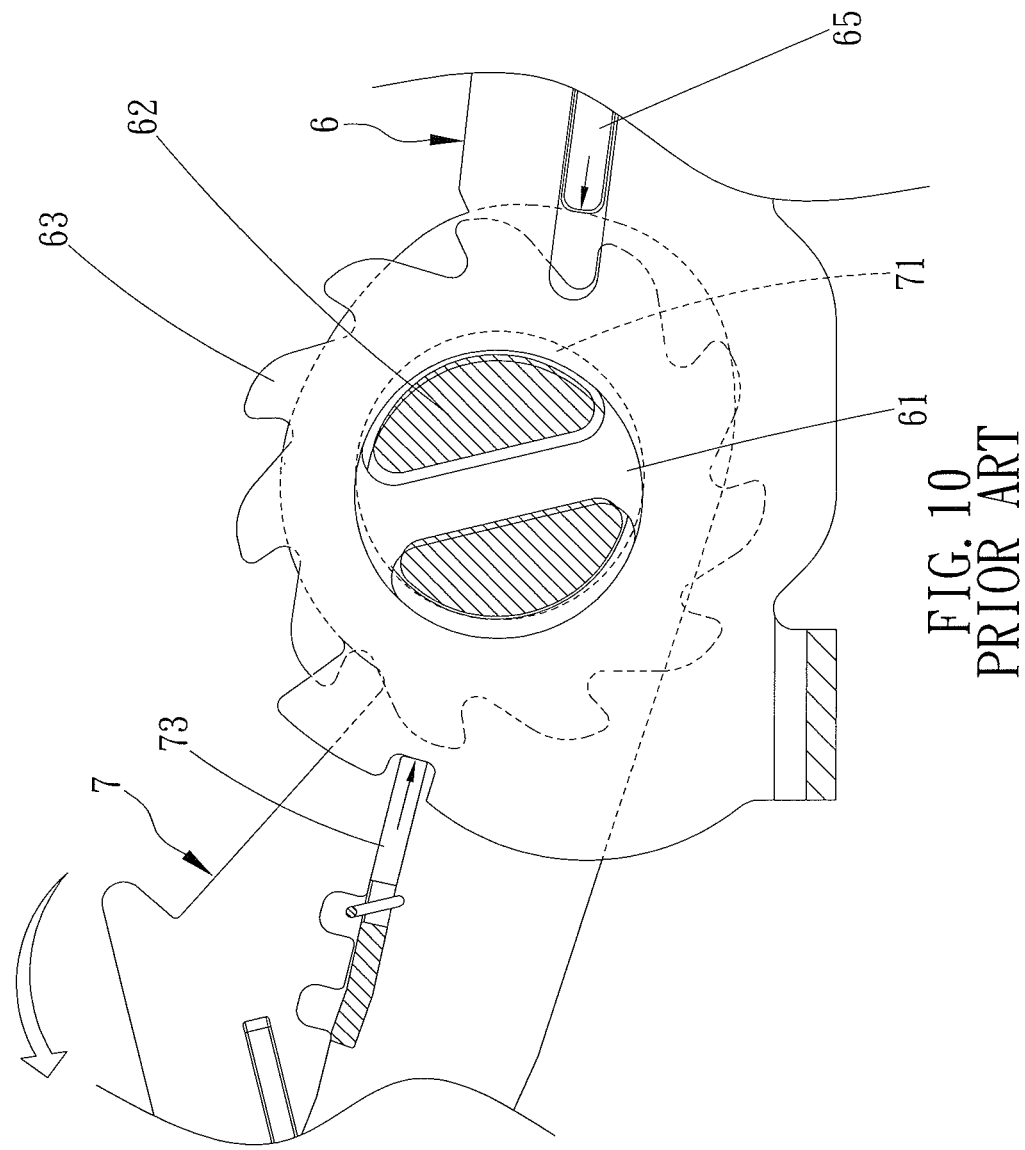
FIG. 10 is a partially enlarged cross-sectional side view of a pivotal shaft of the ratchet buckle in accordance with the prior art.

As shown in FIG. 7, by engaging the positioning rod 22 of the trigger 2 to the two positioning notches of the body 1, the relative location of the trigger 2 and the body 1 is limited to make the locking board 17 provide a pushing force to the trigger 2 and to make the pushing board 24 of the trigger 2 provide a pushing force to the body 1. The pushing forces are compensated by the engagement of the positioning rod 22 of the trigger 2 and the positioning notches 15 of the body 1. Therefore, the two pivotal holes 11 of the body 1 and the shaft holes 21 of the trigger 2 are kept concentric without misalignment which can cause the shearing force to the pivotal shaft 13. In other words, the pivotal shaft 13 is in a free status and can be rotated with a small force, and thus, the straps 31, 41, can be easily reeled by pulling.

As shown in FIGS. 1, 2, 3 and 5, the fixing rod 18 on the second end of the body 1 has a resilient pressing element 19 to trim the strap 31 and keep the strap 31 located at a proper position but not to slide and drive the pivotal shaft 13 to rotate.

According to above structure in the preferred embodiment, the ratchet buckle of the present invention has the following advantages:

1. By having the two opposite positioning notches 15 on the body 1 and the positioning rod 22 on the trigger 2, the positioning rod 22 is wedged into the positioning notches 15 of the body 1 when the trigger 2 is pulled away from the body 1 to make the ratchet buckle be in an expand status. Thus, the two pivotal holes 11 of the body 1 and the shaft holes 21 of the trigger 2 are kept concentric to ensure that the pivotal shaft 13 is not pressed by the shearing force and to be in a free status to make the straps 31, 41 easily reeled. Thus, the convenience of the ratchet buckle is improved.

2. When the trigger 2 is pulled away from the body 1 to expand, the pivotal shaft 13 is not pressed by the shearing forces from the two pivotal holes 11 of the body 1 and the shaft holes 21 of the trigger 2 by engaging the positioning rod 22 to the two positioning notches 15 of the body 1. Therefore, the straps 31, 41 can be easily reeled. Such structure can be applied to different ratchet buckles in which the pivotal shaft 13 is in a free status, and the straps 31, 41 are easily reeled.

Although this invention has been described in its preferred form with a certain degree of particularity, it is understood that the present invention of the preferred form has been made only by way of example and that numerous changes in the details of construction and the combination and arrangement to of parts any be resorted to without departing from the spirit and scope of the invention.

What is claimed is:

1. A ratchet buckle comprising:
    a body having:
        two pivotal holes formed oppositely to engage with a pivotal shaft adapted to reel a strap;
        two positioning notches; and
        two ratchet wheels attached on inner sides of the two pivotal holes respectively;
    a locking board slideably mounted in the body and engaging the two ratchet wheels, with the pivotal shaft located intermediate the two positioning notches and the locking board in a plane extending through the pivotal shaft, the two positioning notches and the locking board; and
    a trigger having a first end and a second end, wherein the first end of the trigger has:
        two shaft holes formed oppositely and sleeving the pivotal shaft of the body; and
        a positioning rod transversally attached to the first end of the trigger and engaged to the two positioning notches of the body to locate the relative position of the body and the trigger to keep the two pivotal holes of the body and the two shaft holes of the trigger concentric and to keep the pivotal shaft of the body from being pressed by shearing force to rotate easily;
    wherein a distance between the centers of the positioning notches and the pivotal holes of the body is equal to a distance between centers of the positioning rod and the shaft holes of the trigger, with the trigger capable of pivotal movement relative to the body between a first position at an acute angle to the trigger and an expanded status at an obtuse angle to the trigger board, with the positioning rod engaged in the two positioning notches in the expanded status.

2. The ratchet buckle as claimed in claim 1, wherein the two positioning notches of the body are concave arcs; and
    the positioning rod of the trigger has a round cross-section.

3. The ratchet buckle as claimed in claim 1, wherein the body includes an extension including the two positioning notches, with the two pivotal holes located intermediate the locking board and the extension.

4. The ratchet buckle as claimed in claim 3, further comprising a supporting rod in the extension and intermediate the two positioning notches.

5. A ratchet buckle comprising:
a body having a first end and a second end, wherein the first end of the body has:
- two pivotal holes to engage with a pivotal shaft adapted to reel a strap;
- two positioning notches; and
- two ratchet wheels attached on inner sides of the two pivotal holes respectively; and a trigger having a first end and a second end, wherein the first end of the trigger has:
- two shaft holes formed oppositely and sleeving the pivotal shaft of the body; and
- a positioning rod transversally attached to the first end of the trigger and engaged to the two positioning notches of the body in an expanded status to locate the relative position of the body and the trigger to keep the two pivotal holes of the body and the two shaft holes of the trigger concentric and to keep the pivotal shaft of the body from being pressed by shearing force to rotate easily;

wherein a distance between the centers of the positioning notches and the pivotal holes of the body is equal to a distance between centers of the positioning rod and the shaft holes of the trigger, and wherein the second end of the body has a resilient pressing element adapted to abut the strap.

* * * * *